United States Patent
Zhang et al.

(10) Patent No.: US 7,925,716 B2
(45) Date of Patent: *Apr. 12, 2011

(54) FACILITATING RETRIEVAL OF INFORMATION WITHIN A MESSAGING ENVIRONMENT

(75) Inventors: Chen Zhang, Monte Sereno, CA (US); Henri P.J. Torgemane, Santa Clara, CA (US); Frank J. Cort, Mountain View, CA (US); T. S. Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1509 days.

This patent is subject to a terminal disclaimer.

(21) Appl. No.: 11/295,309

(22) Filed: Dec. 5, 2005

(65) Prior Publication Data

US 2007/0130276 A1    Jun. 7, 2007

(51) Int. Cl.
G06F 15/16    (2006.01)
(52) U.S. Cl. ...................................................... 709/218
(58) Field of Classification Search .................. 709/218, 709/206, 207
See application file for complete search history.

(56) References Cited

U.S. PATENT DOCUMENTS

| | | | |
|---|---|---|---|
| 6,572,660 B1 * | 6/2003 | Okamoto | 715/272 |
| 2006/0026147 A1 * | 2/2006 | Cone et al. | 707/3 |
| 2006/0085515 A1 * | 4/2006 | Kurtz et al. | 709/207 |
| 2007/0124385 A1 * | 5/2007 | Denny et al. | 709/206 |
| 2009/0285394 A1 * | 11/2009 | Diamond | 380/259 |

FOREIGN PATENT DOCUMENTS

WO    WO 01/22680 A2 *    3/2001

* cited by examiner

*Primary Examiner* — John Follansbee
*Assistant Examiner* — Alan S Chou
(74) *Attorney, Agent, or Firm* — Hickman Palermo Truong & Becker LLP

(57) ABSTRACT

Techniques and mechanisms are provided that allow participants in an electronic messaging conversation (e.g. email or instant message) to retrieve information related to words and phrases in the electronic messaging conversation without leaving the electronic messaging environment. An electronic messaging environment is provided that includes user interface tools that allow a user to (1) select text within the EM conversation, (2) submit the text to an information retrieval service, such as a search engine, and (3) display the results generated by the information retrieval service. To facilitate the selection of relevant text, certain "suggested words" within the conversation may automatically be highlighted by the instant messaging client. Various techniques are provided for customizing which words are suggested, which sources are searched, and which search terms are used.

36 Claims, 7 Drawing Sheets

FACILITATING RETRIEVAL OF INFORMATION WITHIN A MESSAGING ENVIRONMENT

FIELD OF THE INVENTION

The present invention relates to instant messaging and, more specifically, to facilitating retrieval of information within a messaging environment.

BACKGROUND

People can now communicate with each other in more ways than ever before. One popular way to communicate with others is through electronic messaging. Electronic messaging includes, for example, email messaging and instant messaging. In email messaging, text is entered by one user, and is sent to an electronic mailbox associated with another user. After the message is in the mailbox, the owner of the mailbox may retrieve and read the message. Frequently, a significant amount of time elapses between the transmission of an email message to an intended recipient, and the presentation of the message to the intended recipient.

In an instant messaging environment, text that is entered by one user is immediately displayed to one or more other users. The one or more other users may reply in like fashion, resulting in a text-based conversation that takes place in real time. Instant messaging environments include one-to-one "chat sessions", one-to-many "broadcasts", and many-to-many chat rooms and online conferences. The communications of an instant messaging conversation may include non-textual elements as well, such as images, sound bytes, animations and video clips.

The specific action that triggers the sending of the text from the device on which the text was entered to the other devices involved in an instant messaging conversation may vary from environment to environment. For example, in some environments, text may be sent from one device to the others when the user that entered the text presses the "enter" key. In other environments, each text character may be sent as it is typed into the device. The techniques described herein are not limited to any particular instant messaging environment, nor any particular technique for sending text between devices.

Conversations that occur through electronic messages, whether via email or instant messaging, are referred to herein as electronic message conversations ("EM conversations"). For both asynchronous and asynchronous electronic conversations, the conversations typically unfold one message at a time. For the purposes of the techniques described herein, even a single message constitutes a conversation. Software environments that support EM conversations, such as email systems and instant messaging systems, are referred to herein as EM environments.

Electronic messaging conversations often touch on topics on which one or more conversation participants are not fully informed. When a participant in an electronic messaging conversation sees that the conversation has turned to a topic that is not familiar to the participant, the participant will often leave the electronic messaging environment and perform a search to obtain more information about the topic. After reviewing the search results, the participant can return to the electronic messaging environment, better informed about that particular topic.

Unfortunately, the flow of an instant messaging conversation can be disrupted as participants move back and forth between the instant messaging conversation and the searching environment. For example, a user may be in a chat room where the topic of conversation turns to a particular highly-publicized trial. The user may not be familiar with the trial. To become informed, the user may minimize the window that shows the chat room conversation, and activate a browser application. The user may then navigate the browser application to a search engine page, and submit a search query to obtain information about the trial. The user may then peruse the search results to become informed about the trail. Once properly informed, the user may minimize the browser and restore the chat room window, merely to find out that the chat room conversation has long since moved on to another topic.

Even when the electronic messaging conversation is asynchronous, switching between the EM environment and the searching environment may be cumbersome. For example, it may become tedious for a user to repeatedly copy text from an email message, switch to a browser, paste the text into the input field of a search page, perform a search, study the results, and then return to the email message.

Based on the foregoing, it is desirable to provide techniques and mechanisms that allow a participant in an electronic messaging conversation to quickly obtain information about topics that are mentioned in the conversation in a manner that minimizes the disruption to the conversation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
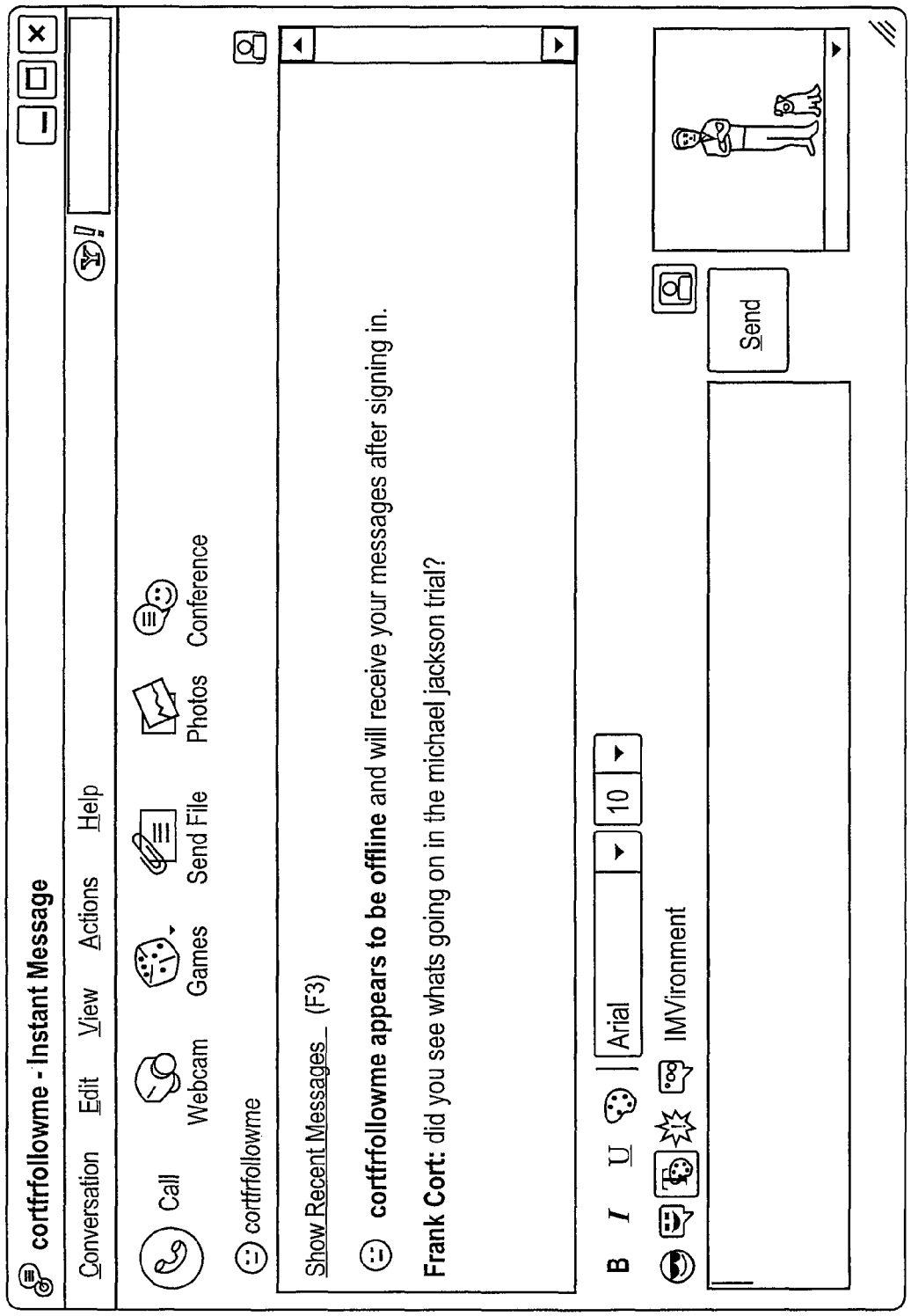
FIG. 1 is a block diagram of an IM environment in which suggested words are visually highlighted, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques and mechanisms are provided that allow participants in an electronic messaging conversation to retrieve information related to words and phrases in the electronic messaging conversation without leaving the electronic messaging environment. Specifically, an electronic messaging environment is provided that includes user interface tools that allow a user to (1) select text within the EM conversation, (2) submit the text to an information retrieval service, such as a search engine, and (3) display the results generated by the information retrieval service.

In one embodiment, while an EM client (e.g. a mail reader, instant messaging client, etc.) is being used in an EM conversation, the EM client compares the text of the IM conversation against a list of "suggested words". In response to detecting a suggested word within the EM conversation, the EM client displays the suggested word in a manner that visually distinguishes the suggested word from the other text in the EM conversation. Retrieving information relating to the suggested words that are thus highlighted is made easier in that the suggested words are effectively "pre-selected" within the EM conversation. Various techniques are provided for customizing the list of suggested words on a per-user basis, as well as customizing the sources from which additional information is retrieved.

It should be noted that a "suggested word" need not be an actual word. For example, a "suggested word" may be a phrase that includes several words. A suggested word may also be a number, a symbol, or any combination of alphabetic, numeric and symbolic characters.

Retrieving Information Related to Words in an EM Conversation

According to one embodiment, a participant in an EM conversation may select any words or phrases from the conversation, and directly invoke a mechanism to retrieve additional information based on the selected words without leaving the EM environment. Specifically, the EM environment includes user interface controls that allow the user to (1) select text from the window that contains the EM conversation, and (2) initiate an operation to retrieve information related to the selected words.

The specific user interface controls that are provided for text selection and information retrieval may vary from implementation to implementation. For example, in one implementation, text selection is performed in the conventional manner by pushing a mouse button down at the start of the target text, holding the mouse button down while dragging the cursor to the end of the target text, and then releasing the mouse button.

The controls for initiating the retrieval of related information may, for example, include a button, icon, or other control which, when activated, causes the retrieval operation to be performed based on any words that the user has selected. In one embodiment, the EM client may be designed so that the information retrieval control is displayed in a "disabled" state until text is actually selected in the EM conversation. In an alternative embodiment, the information retrieval control itself is not displayed at all until text is selected. Once text is selected, the control is displayed adjacent to the selected text.

Instead of or in addition to an information retrieval control, the EM client may be configured to initiate an information retrieval operation based on the selected words in response to a particular key combination. Buttons, icons, menus, and key combinations are merely examples of the types of user interface controls that may be used to initiate the retrieval of information based on selected text in an EM conversation. The techniques described herein are not limited to any particular type of user interface control for initiating the information retrieval operation.

When the user provides the user input to initiate an information retrieval operation, the EM client sends messages to one or more information sources. The information sources to which the EM client sends messages may vary based on a variety of factors that will be described in greater detailed below. In a relatively simple implementation, the selected text is sent to a search engine, and the results of the search engine's search are provided to the user in a manner that does not require the user to leave the EM environment. For example, the results of the search may be provided in a pop-up window in the EM environment, in an overlay within the EM environment, or in a panel or window that is part of the EM environment. The techniques described herein are not limited to any particular mechanism for displaying the information that is retrieved based on the selected words from the EM conversation.

Suggested Words

As mentioned above, controls are provided to allow a participant in an EM conversation to retrieve information related to any words or phrases from the EM conversation. However, to facilitate the use of the information retrieval mechanism, certain words and phrases may be automatically "suggested" to the user. Specifically, in one embodiment, each EM client is configured to compare words and phrases within an EM conversation against a list of "suggested" words. When the EM client detects a suggested word in an EM conversation, the EM client provides interface controls that facilitate the retrieval of additional information based on the suggested words.

In one embodiment, suggested words are visually distinguished from the other text in the EM conversation to highlight the suggested words to the EM user. Referring to FIG. 1, it is a block diagram of an IM environment in which suggested words are visually highlighted, according to an embodiment of the invention. As mentioned above, an IM environment is an example of a synchronous electronic messaging environment. For the purpose of explanation, several examples shall be given with reference to an IM environment. However, the techniques described herein are equally applicable to asynchronous EM environments, such as email systems.

In the IM conversation illustrated in FIG. 1, the words "Michael Jackson" are underlined, to indicate that "Michael Jackson" is a suggested word. Underlining is merely one example of how a suggested word may be visibly distinguished from the other text in the IM conversation. Instead of or in addition to underlining, suggested words may be shown in different colors, different fonts, different styles, and/or different sizes than other text. The techniques described herein are not limited to any particular way of visibly distinguishing suggested words.

Figure 2:
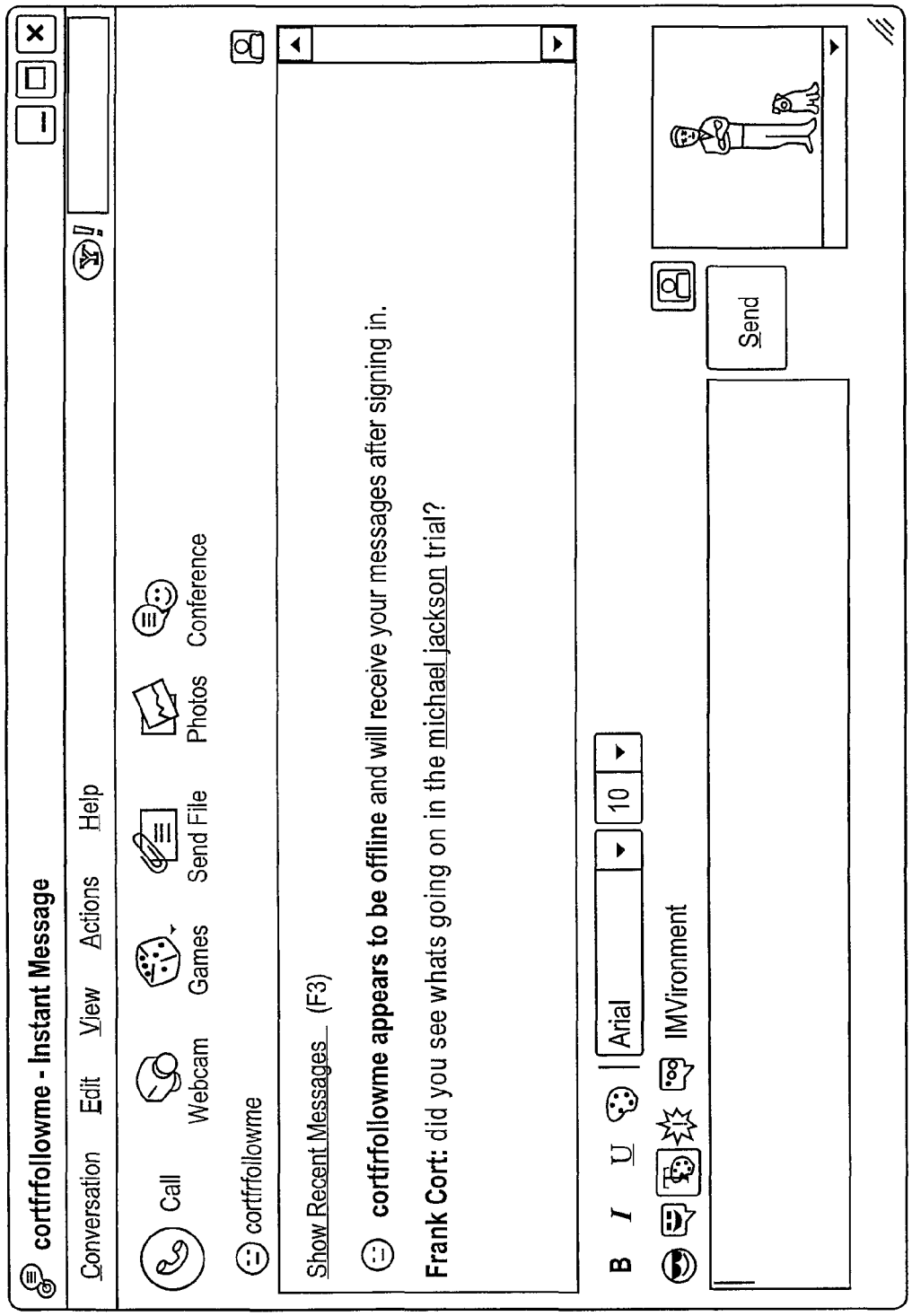
FIG. 2 is a block diagram that illustrates how the visual depiction of a suggested word changes when the user hovers the cursor over suggested word, according to an embodiment of the invention.

As mentioned above, the EM environment includes user interface controls that facilitate the retrieval of information based on suggested words. For example, in one embodiment, when the user hovers the cursor over suggested words, the visual depiction of the suggested words changes, as illustrated in FIG. 2. The user may then simply click on the highlighted suggested words to initiate the retrieval of information based on the suggested words.

Figure 3:
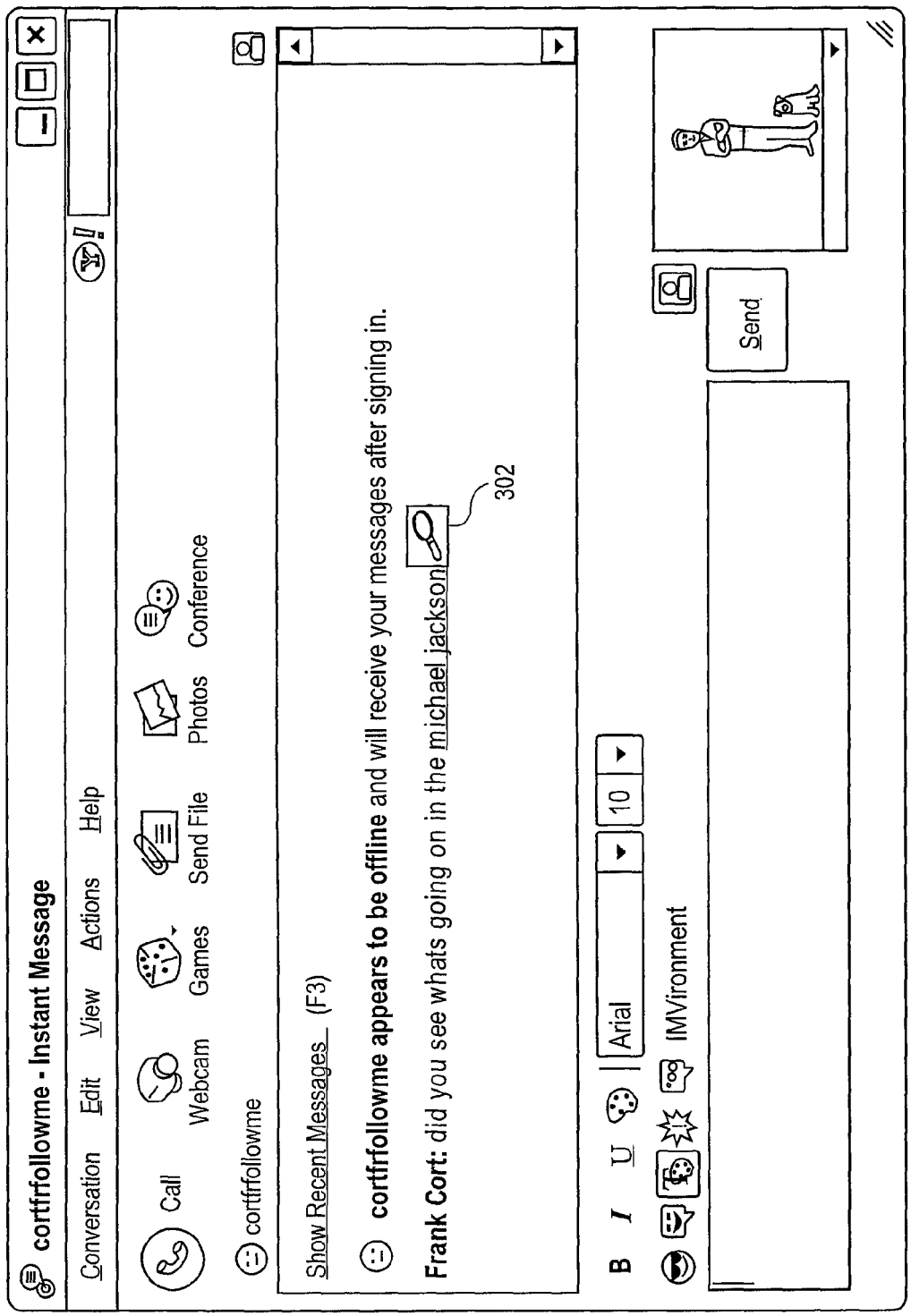
FIG. 3 is a block diagram that illustrates an IM client in which hovering over suggested words causes an icon to be displayed immediately adjacent to the suggested words, according to an embodiment of the invention.

FIG. 3 illustrates an embodiment in which hovering over suggested words not only changes the visual depiction of the suggested words, but causes an icon 302 to be displayed immediately adjacent to the suggested words. In one embodiment, the retrieval of information based on the suggested words is initiated by clicking on the icon 302. In another embodiment, the retrieval of information based on the suggested words is initiated merely by hovering the cursor over the icon 302.

Figure 4:
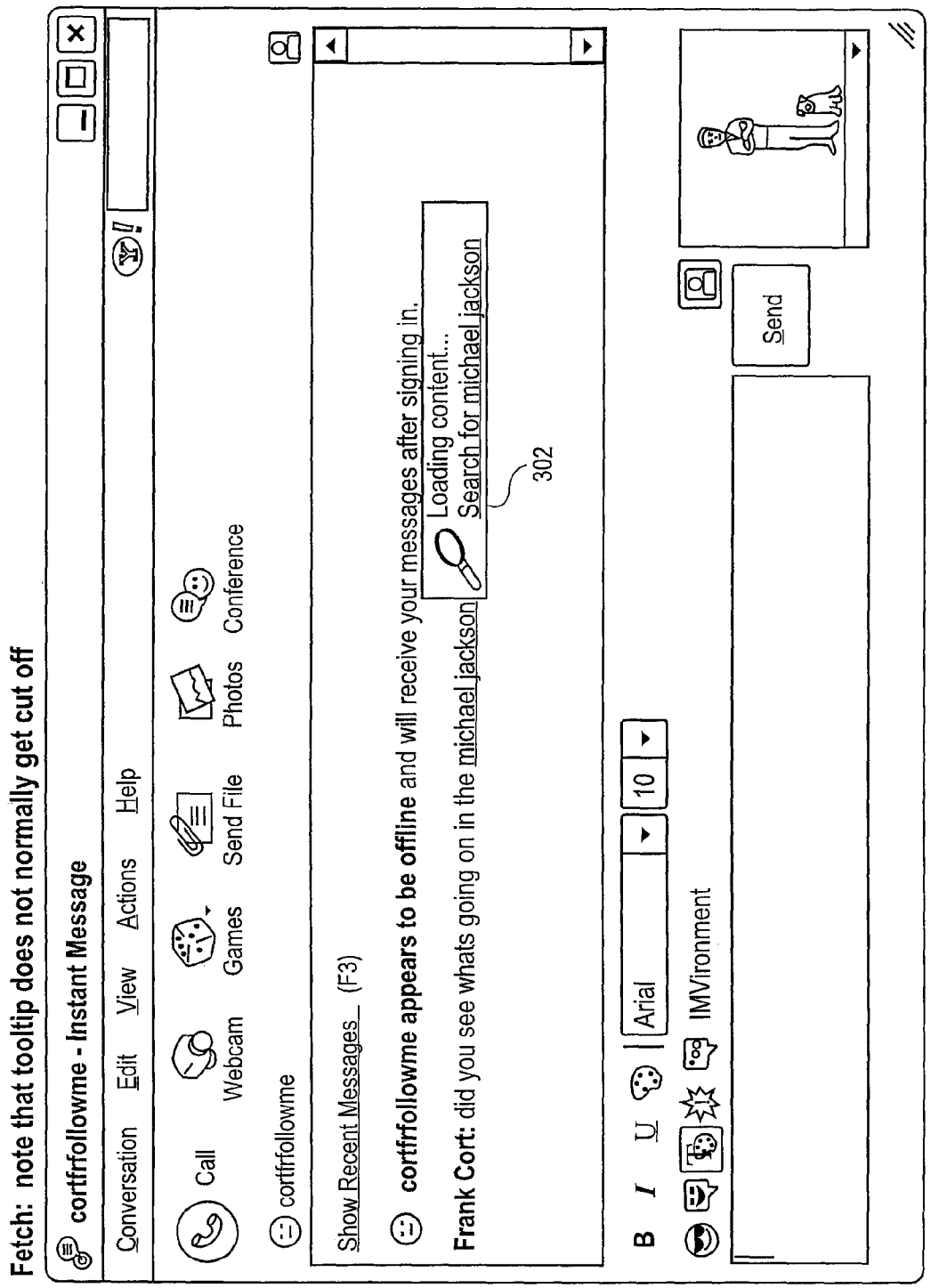
FIG. 4 is a block diagram that illustrates an IM environment (1) after the user has initiated an information retrieval operation, and (2) before the information retrieval operation has been completed, according to an embodiment of the invention.

FIG. 4 is a block diagram that illustrates the IM environment (1) after the user has initiated an information retrieval operation, and (2) before the information retrieval operation has been completed. Specifically, the IM client uses an overlay, directly adjacent to the icon 302, to indicate "loading content . . . Search of Michael Jackson".

Figure 5:
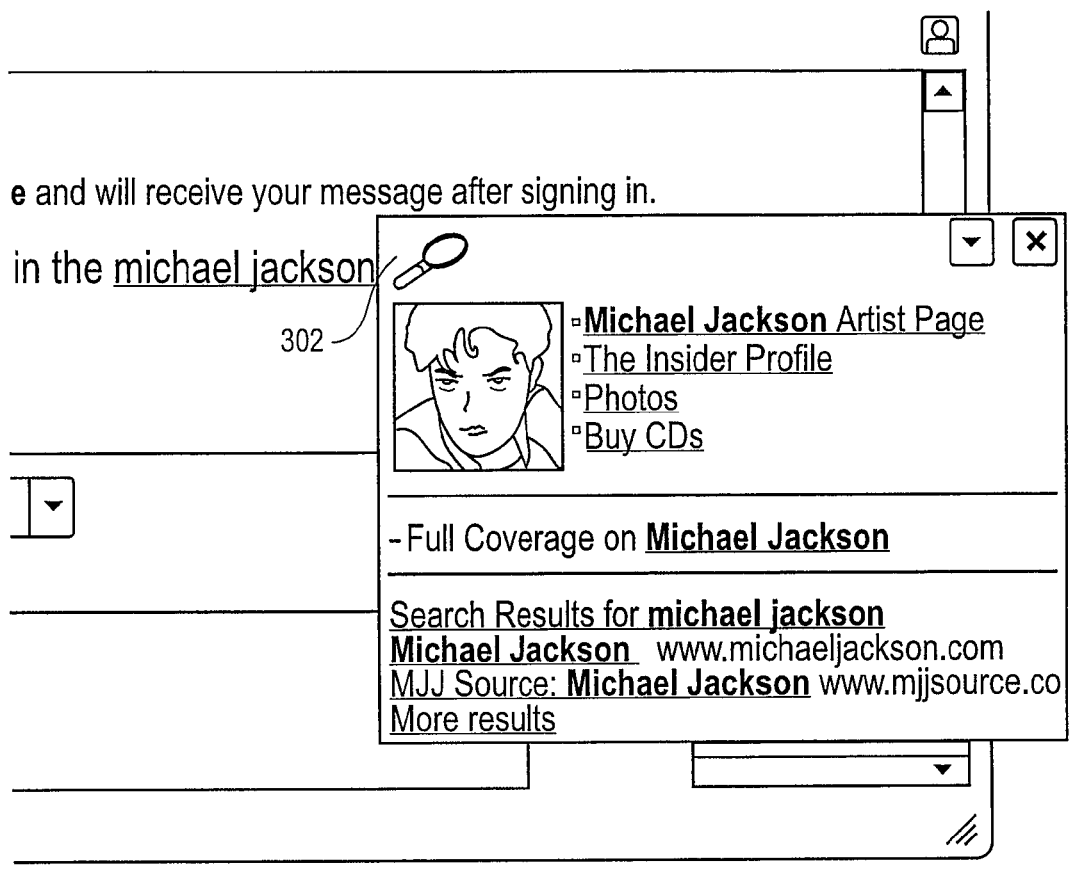
FIG. 5 is a block diagram that illustrates an IM environment after the information retrieval operation has been completed, according to an embodiment of the invention.

FIG. 5 is a block diagram that illustrates the IM environment after the information retrieval operation has been completed. In the embodiment illustrated in FIG. 5, the results of the retrieval operation are displayed in an overlay adjacent to icon 302. As illustrated in this example, the information retrieved may itself contain "active" elements which may be selected to retrieve further information. For example, the retrieved information may contain hyperlinks which, when selected by the user, may cause the retrieval of additional information. The information retrieved in this manner may be presented to the user in a variety of ways. In on embodiment, the information that is retrieved when the user selects one of the hyperlinks merely replaces the content that is currently displayed in the overlay. In an alternative embodiment, the retrieved content is displayed in another window.

Category-Based Customization of Suggested Words

Providing a mechanism to easily retrieve information about suggested words is only helpful if the suggested words include words and phrases that are of interest to the user. If the IM client repeatedly highlights suggested words that are not of interest to the user, then the use of suggested words may become more of a bother than an aid. Therefore, according to one embodiment of the invention, the user is provided with various means to customize which words are "suggested" to the user.

According to one embodiment, a third party to the EM conversation (such as the party that develops IM software and/or facilitates IM connections) establishes a set of categories and, for each category, a set of suggested words. For example, one category may be "dogs", and the suggested words within the "Dogs" category may be "Great Dane", "Poodle", "Blood Hound", etc. In such an embodiment, the EM clients are designed with user interface controls that allow the user to select which suggested words categories are of interest to the user. The EM client then stores the selected suggested words categories as part of the user's "preferences". While the user is participating in an EM conversation, the EM client only treats as suggested words those suggested words that are associated with the suggested words categories that the user has selected.

According to one embodiment, the suggested words that belong to any particular category may change over time. For example, one suggested word category may be "current news". The party that manages the suggested words categories may want to change the suggested words that are under the "current news" category on a daily basis.

To facilitate the changing of the suggested words within a category, the EM client periodically receives, from a server managed by the third party, the list of suggested words that belong to the categories that have been selected by the user. In one embodiment, when the EM client is launched, the EM client reads the user preferences to determine the selected categories, sends a list of the selected categories to the third party server, and receives from the third party server the list of suggested words that are currently in each of the selected categories. As shall be described in greater detail below, the actual update may only include changes that have occurred to the subscribed suggested word lists since the most recent previous update.

In an alternative embodiment, the third party server "pushes" to each EM client any changes that occur in the suggested words for any selected category. For example, a particular phrase may be added as a suggested word to the "current news" category. In response to the addition of the particular phrase, the third party server may determine all of the IM clients that have selected the "current news" category, and send to those IM clients a message that indicates the addition of that particular phrase to the category.

In the embodiment described above, all categories are at the same level. However, in more sophisticated embodiments, the category structure may be hierarchical, and may have many levels of categories and subcategories. For example, the highest level of categories may include the category "Sports". The Sports category may have Baseball and Football. Baseball may have College Baseball and Professional Baseball. Professional Baseball may have a sub-category for each professional baseball team. According to one embodiment, a user may subscribe to any level in the hierarchy. For example, an avid sports fan may subscribe to the Sports category. Another less avid sports fan may only subscribe to the category associated with his hometown baseball team.

According to one embodiment, a user's subscription to a category is not an all-or-nothing decision. Rather, the user may indicate a degree of interest in a category. For example, the user may select among the interest levels: HIGH, NORMAL and NONE. If the user selects "NONE", then the user is not subscribed to the category. If the user selects "NORMAL", then the user subscribes to a subset of suggested words that belong to the category. For example, the NORMAL subset may include suggested words for the topics most commonly discussed in that category. Selecting HIGH subscribes to all suggested words in the category. The suggested words for the HIGH subscriber may include more esoteric words.

In an embodiment in which users may subscribe to categories to different degrees, the degree to which a user has subscribed to a category may also affect which search sources are queried when a suggested word from the category is selected by an IM user. For example, when a NORMAL subscriber to a "computer" category initiates a search based on a suggested word from the "computer" category, the EM client may retrieve information from a general encyclopedia. On the other hand, when a HIGH subscriber to the "computer" category initiates a search based on the same suggested word from the "computer" category, the IM client may retrieve information from a technical dictionary. Various factors that determine which search sources are queried shall be described in greater detail hereafter.

Package-Based Customization of Suggested Words

Instead of or in addition to customizing suggested words based on suggested word categories managed by a third party, the EM client may support "package-based" customization of selected words. In this context, a "package" is one or more files that specifies a suggested word list. The EM client includes a mechanism that allows a user to "subscribe" to packages. When a user is subscribed to a package, the EM client treats all words in the suggested word list of the package as suggested words.

Different packages may be generated by many different sources, including individual EM users themselves. For example, a user may generate a package named "my favorite topics", and include in that package a suggested word list that contains names and phrases that are of interest to the user. The user may then provide that package to a group of friends with whom the user frequently engages in EM conversations.

As another example, different special interest groups may each develop their own package, and provide the package to those who have similar interests. Companies may even have "company packages" to which all of their employees are subscribed. Such company packages may include suggested words that are of particular interest to the business of the company.

Other Customization Factors

The use of categories and packages are merely examples of how a user may customize the list of suggested words that are operative for the user during an EM conversation. Various other factors may also be used to automatically customize the user's operative set of suggested words. For example, a user's operative set of suggested words may be based, in part, on the search terms that the user has previously submitted to a search engine. As another example, their may be a history of which web sites the user has visited, or has added as "bookmarks" in a browser. Certain suggested words may be automatically added to the user's operative suggested word list based on those websites. For example, if one of the web sites related to Chess, then a set of suggested words relating to Chess may be added to the user's suggested word list.

Suggested Word Lists

As described above, both categories and packages include suggested word lists. Such lists may take a variety of forms. For example, in one embodiment, the lists may simply enumerate each suggested word. In alternative embodiments, list may include word patterns and/or regular expressions. For example, a list may include "democra*" to cover all words that begin with the letters "democra", including democracy, democratic, democrat, etc.

The use of word patterns and regular expressions may be particularly helpful in the suggested word lists of specialized packages. For example, a "patent practitioners package" may include, as a suggested word, the pattern #, ###, ### to select all seven digit numbers (the format of most patent numbers).

Suggested word lists may also indicate whether suggested words are case sensitive. For example, certain acronyms may qualify as suggested words only when typed in all capital letters. The EM client may be configured to identify such acronyms as suggested words if (1) they are typed in all capital letters and (2) the user that typed them is not typing everything in capital letters.

Excluded Words

As explained above, users may customize the suggested words used by their EM client by selecting suggested word categories and/or subscribing to one or more packages. However, there may be certain words that the user does not want treated as a "suggested word" even though it belongs to a category or package to which the user subscribes. For example, the user's name may be the same as a famous actor. The name of the actor may be in a "movie stars" category to which the user subscribes. However, the user may not want to see his name highlighted as a suggested word every time someone types his name in an EM conversation. Therefore, according to one embodiment, the EM client includes a mechanism that allows a user to specify an "exclude" list. The EM client does not treat any words in the exclude list as suggested words, even if those words are otherwise in a category or package to which the user subscribes.

In one embodiment, the EM client includes a mechanism to facilitate the addition of words to the exclude list. For example, the EM client may generate a menu when the user right clicks on a suggested word in an EM conversation. The menu may include the option to "exclude from suggested words" option. When this option is selected, the suggested word is added to the exclude list, and will not be treated as a suggested word in the future.

Writer-Specified Suggested Words

At times, a participant in an EM conversation may want to encourage other participants to become better informed about a particular topic. The user may not know whether the words that he will write will be treated as suggested words by the EM clients of the other participants. Therefore, according to one embodiment, the EM client includes a mechanism that allows participants to expressly identify words that they want treated, by the EM clients of the other participants in the EM conversation, as suggested words.

The manner in which users identify such "writer-specified suggested words" may vary from implementation to implementation. For example, in one embodiment, the user may use a special start tag, and end tag, to demarcate a writer-specified suggested word. In another embodiment, the user may press a particular key combination to start, and a particular key combination to end, a writer-specified suggested word. Whatever the mechanism by which the user identified the writer-specified suggested word, the user's EM client sends an indication to the other EM clients that the writer-specified suggested word should be treated as a suggested word.

In embodiments in which users share suggested word lists, the words in a user's "exclude list" may still be excluded, even if they appear in the suggested word lists of others that are being shared by the user.

Shared Suggested Words

As described above, various techniques are provided for customizing, on a per-user basis, the suggested word list that is operative during an EM conversation. Because the suggested word list may be different between participants in the same EM conversation, the participants will see different words highlighted within the EM conversation.

According to one embodiment, an option is provided by which participants within an EM conversation may combine their suggested word lists, so that all participants see the same highlighted suggested words. The combination may be performed, for example, by performing a union between the operative shared lists of all members of the EM conversation. Alternatively, each participant may be given the option to selectively "opt in" to the suggested word lists of other participants in the same conversation. Thus, if users A, B and C are in a three-way EM conversation, user A may opt in to the suggested word lists of users B and C, user B may only opt in to the suggested word list of user C, and user C may not opt in to any other user's list. In this example, all participants would see suggested words seen by user C, but there may be some suggested words seen by user A that are not seen by users B or C.

Customized Retrieval of Information

As explained above, an IM environment is provided that includes a mechanism to initiate the retrieval of information related to words and phrases contained EM conversations. The suggested word mechanism makes it easier for the user to initiate such retrieval operations for words and phrases that are likely to be of interest to the user. However, the suggested words feature is only as useful as the information thus retrieved.

In a simple embodiment, the EM client is configured to retrieve information from a certain set of "default" sources. The default sources may include, for example, an Internet search engine. More sophisticated embodiments, other sources may be used instead of, or in addition to, the default sources. The specific sources from which information is retrieved in response to initiation of an information retrieval operation may vary from operation to operation, based on a variety of factors.

For example, different search sources may be able to handle different sizes of search phrases. Thus, when the set of search terms is less than a certain threshold, the EM client may retrieve information from a different search source than the EM client uses when the search terms exceed that threshold. The size of the search terms is merely one example of a factor that may be used by the EM client in determining which search sources to use for any given information retrieval operation. Various other factors shall be described in greater detail hereafter.

In one embodiment, the retrieval mechanism supports the retrieval and consolidation of information from many sources. For example, the selection of a particular suggested word may cause the retrieval of editorial commentary from one source, images from another source, hyperlinks to related material from another source, and a map from yet another source. The information provided by these sources may be arranged and consolidated by the EM client prior to presentation to the user. In an alternative embodiment, the request from the EM client may be sent to a third party, such as the party that controls the IM system, and the third party may send out the requests to the different sources and then consolidate the responses, prior to sending the consolidated responses back to the EM client.

Category-Customized Retrieval of Information

According to one embodiment, the party that establishes the suggested word categories also specifies, for each suggested word category, the sources from which information will be retrieved in response to selection of those suggested words. For example, the "Current News" category may be defined to retrieve information from a particular news source, while the "Dogs" category may be defined to retrieve information from a particular encyclopedia of dogs. Similarly, a "Career" category may be defined to retrieve information from a jobs listing service, whereas a "Stocks" category may be defined to retrieve information from a financial service provider.

Instead of or in addition to such category-wide search sources, each suggested word may itself be associated with a set of word-specific search sources. For example, category X may include words A and B. Search source S1 may be associated with category X. Search source S2 may be associated with suggested word B. Assume that words A and B occur in an EM conversation, and that a participant in the conversation has subscribed to category X. Under these conditions, if the user initiates a retrieval operation based on word A, then the retrieval operation will retrieve information from search source S1. On the other hand, if the user initiates a retrieval operation based on word B, then the retrieval operation will retrieve information from both search source S1 and search source S2.

Package-Based Customization of Search Sources

In addition to listing a set of suggested words, each package may also list a set of search sources to be used when those suggested words are selected. The package may specify package-wide search sources, as well as word-specific search sources.

For example, package X may include words A and B. Search source S1 may be identified as a package-wide search source. Search source S2 may be associated with suggested word B. Assume that words A and B occur in an EM conversation, and that a participant in the conversation has subscribed to package X. Under these conditions, if the user initiates a retrieval operation based on word A, then the retrieval operation will retrieve information from search source S1. On the other hand, if the user initiates a retrieval operation based on word B, then the retrieval operation will retrieve information from both search source S1 and search source S2.

The combination of pattern-specified suggested words, and word-specific search sources, may be helpful in a variety of contexts. For example, assume that a "patent practitioners package" includes, as a suggested word, the pattern #, ###, ###. The package may specify, for this suggested word pattern, a search source that is specifically designed to retrieve patents based on patent numbers. Then when a subscriber to the patent practitioners package is involved in an EM conversation that includes a patent number, the subscriber can easily initiate retrieval of the patent in question.

User Profile Based Customization

Typically, the user of an EM client creates a profile that contains information about the user. According to one embodiment, the user's profile may include information that is used by the EM client to determine (1) which words to treat as suggested words and/or (2) which search sources to use when a suggested word is invoked.

For example, the user's profile may indicate that the user is a lawyer. Based on this information, the EM client may treat a list of legal terms as suggested words. In addition, the EM client may include, within the search sources for that user, a legal encyclopedia that would not otherwise be included.

Certain search sources may require paid subscriptions. A user's profile may indicate the paid search sources to which the user subscribes. Based on this information, the EM client may determine whether or not to invoke a paid search source in response to user selection of a suggested word.

Search Terms

As mentioned above, after text has been selected from an EM conversation, the user may initiate an information retrieval operation. The search sources from which information is retrieved will vary based on a variety of factors, as explained above. In addition, the search terms that are used in the retrieval operation may vary based on a variety of factors. Thus, in a simple embodiment, the search performed in response to the selection of certain text in an EM conversation simply uses the selected text as the search terms. In more sophisticated embodiments, the search terms may take into account a variety of other information.

Search Terms Based on Profile Information

According to one embodiment, a user may select an option that allows certain parts of the user's profile to be used in the search operation. For example, assume that such a user selects, from within an EM conversation, a suggested word that is the name of a particular restaurant chain. It is possible that the searcher would be interested in finding the restaurant, within that chain, that is closest to the user. Under these circumstances, the EM client may retrieve, from the user's profile information, the zip code of the user. The EM client may then send the zip code, along with the name of the restaurant chain, to a search source that provides a map to the restaurant that is closest to that zip code.

Searching Based on Context

According to one embodiment, the EM client may include, as part of the search terms, other words from the EM conversation. Specifically, within the EM conversation, a suggested word appears within a context. The meaning of the selected suggested word may vary greatly based on the context in which the suggested word occurs. For example, a "bar" in a conversation among weight lifters may have a very different meaning than a "bar" in a conversation among fraternity brothers. By including more words from the EM conversation in the search, the search results are more likely to be tailored to the context in which the selected suggested word occurred.

According to one embodiment, the search may be performed in phases. In the first phase, the search is performed based on the selected suggested word alone. If the search results thus produced satisfy certain criteria, then the results are returned to the EM client and no further searching is performed. However, if the search results do not satisfy the criteria (e.g. the search produced too many or too few "hits"), then the search is re-executed using additional words from the EM conversation that reflect the "context" of selected suggested word. The second round of searching may not only include more search terms, but may also include different search sources.

Search Terms Based on Category

According to one embodiment, the search terms sent by the EM client to the search sources may take into account the category of the selected suggested word. For example, assume that the word X is a suggested word in both category Y and category Z. Assume that a particular user subscribed to category Y but not to category Z. If that particular user selects word X in an EM conversation, the EM client may perform a retrieval operation based on search terms that include terms that are specific to category Y. In contrast, if a user that subscribes to category Z but not category Y selects the same suggested word, the retrieval operation may be based on search terms that are specific to category Z. Thus, two users that select the same suggested word may initiate searches that use different search terms as a result of the users subscribing to different categories.

Search Terms Based on Package

According to one embodiment, the search performed by the EM client may take into account the package of the selected suggested word. For example, assume that the "patent practitioners package" specifies that the search term "patent" be used for any searches performed on suggested words in the package. Assume that "publication" is one of the suggested words in the package. If subscriber to the package selects the word "publication" in an EM conversation, then the EM client may perform a retrieval operation based on search terms "patent" and "publication".

Example Control Flow

Figure 6:
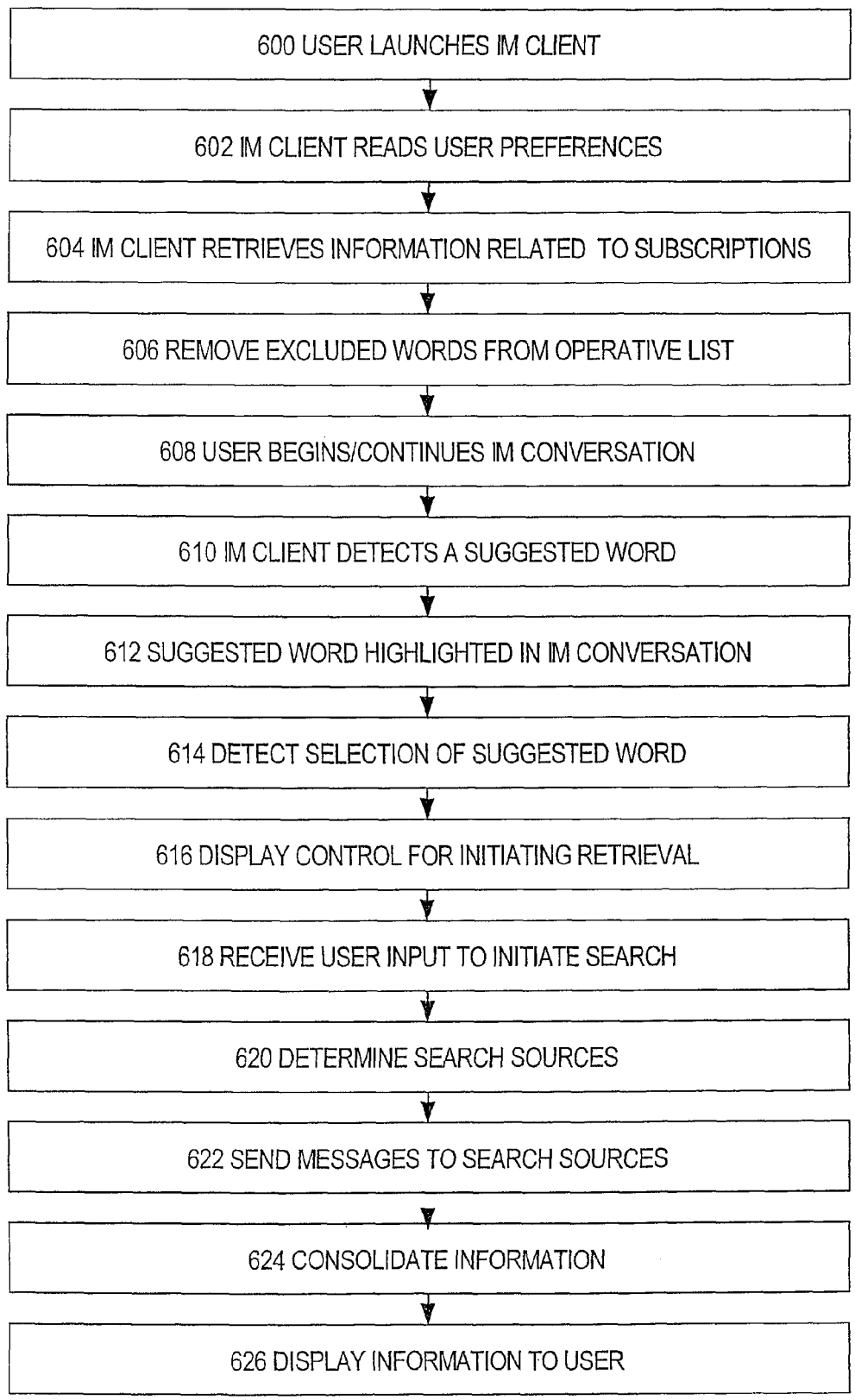
FIG. 6 is a flowchart that illustrates the steps for retrieving information based on text in an IM conversation, according to an embodiment of the invention.

Referring to FIG. 6, it is a flowchart that illustrates the steps for retrieving information based on text in an EM conversation, according to an embodiment of the invention. At step 600, the user launches an EM client. At step 602, the EM client reads the user preferences to determine (1) the categories to which the user has subscribed, and (2) the packages to which the user has subscribed. At step 604, the EM client retrieves information associated with the subscribed categories, and information from the subscribed packages.

As mentioned above, the information associated with the subscribed categories may include a suggested word list for the categories, search sources for the categories, and search sources for the individual suggested words in the suggested word list. Similarly, each package may contain a suggested word list, search sources for the categories, and search sources for the individual suggested words in the suggested word list.

According to one embodiment, the information retrieved at step 604 is primarily locally-stored information that was previously received from remote servers. Step 604 may involve "refreshing" this previously-received information by retrieving from remote servers only the information that has changed since the previous time that the EM client retrieved information. Thus, if only one suggested word was added to the list of a subscribed category, then the information received over the network by the EM client in step 604 for that category would only include the one new suggested word. In an embodiment in which changes to categories are continuously "pushed" to EM clients, step 604 may involve only reading previously-received information, and not require interaction with the server of the party that manages the categories.

The suggested word lists of the subscribed categories and subscribed packages are collectively referred to as the operative suggested word list for the EM client. Thus, the operative suggested word list for an EM client dynamically changes as the user of the EM client subscribed and unsubscribes to categories and packages, and as the suggested words within categories and packages change. At step 606, the EM client removes from the operative suggested word list any words in the user's excluded list.

At step 608, the user begins an EM conversation with one or more other IM users. During the EM conversation, the EM client continuously compares the words of the conversation against the operative suggested word list. When text within the EM conversation matches a suggested word in the operative suggested word list (step 610), the EM client displays the text in the EM conversation window in a manner that distinguishes the text from text that does not match a suggested word (step 612).

At step 614, the EM client detects that the user is causing the cursor to hover over a suggested word within the EM conversation window. In response, the EM client displays next to the suggested word a control for initiating an information retrieval operation (step 616). At step 618, the EM client receives user input to initiate an information retrieval operation based on the suggested word. The user input may be, for example, a click on the control next to the suggested word, or merely detecting that the cursor is hovering over the control for more than a predetermined amount of time.

At step 620, the EM client determines the set of search sources from which to retrieve information. As mentioned above, the set of search sources that are used may be based on a variety of factors. For example, if the selected suggested word is from a subscribed category, then the set of search sources may be based on whether the category is associated with any particular search sources, and whether, within the category, the specific suggested word is associated with any particular search sources. If the suggested word is from a subscribed package, then the set of search sources may be based on whether the package is associated with any particular search sources, and whether, within the package, the specific suggested word is associated with any particular search sources. The EM client may also take into account the profile of the user to determine whether the user has any paid subscriptions to search sources. The user preferences may also indicate the user's preferred "default" search sources.

At step 622, the EM client sends messages to the search sources in the set of search sources determined at step 620. The messages request the retrieval of information associated with the selected suggested word. As explained above, the retrieval requests may include search terms in addition to the selected suggested word itself. For example, the search terms that are included in the messages may include category-specific search terms, package-specific search terms, information from the user's profile, and/or other text from the EM conversation to provide "context" for the suggested words.

At step 624, the EM client receives and consolidates the information provided by the search sources. At step 626, the EM client presents the information to the user. As mention above, the information may be presented to the user in a variety of ways, including a pop-up window or an overlay.

Hardware Overview

Figure 7:
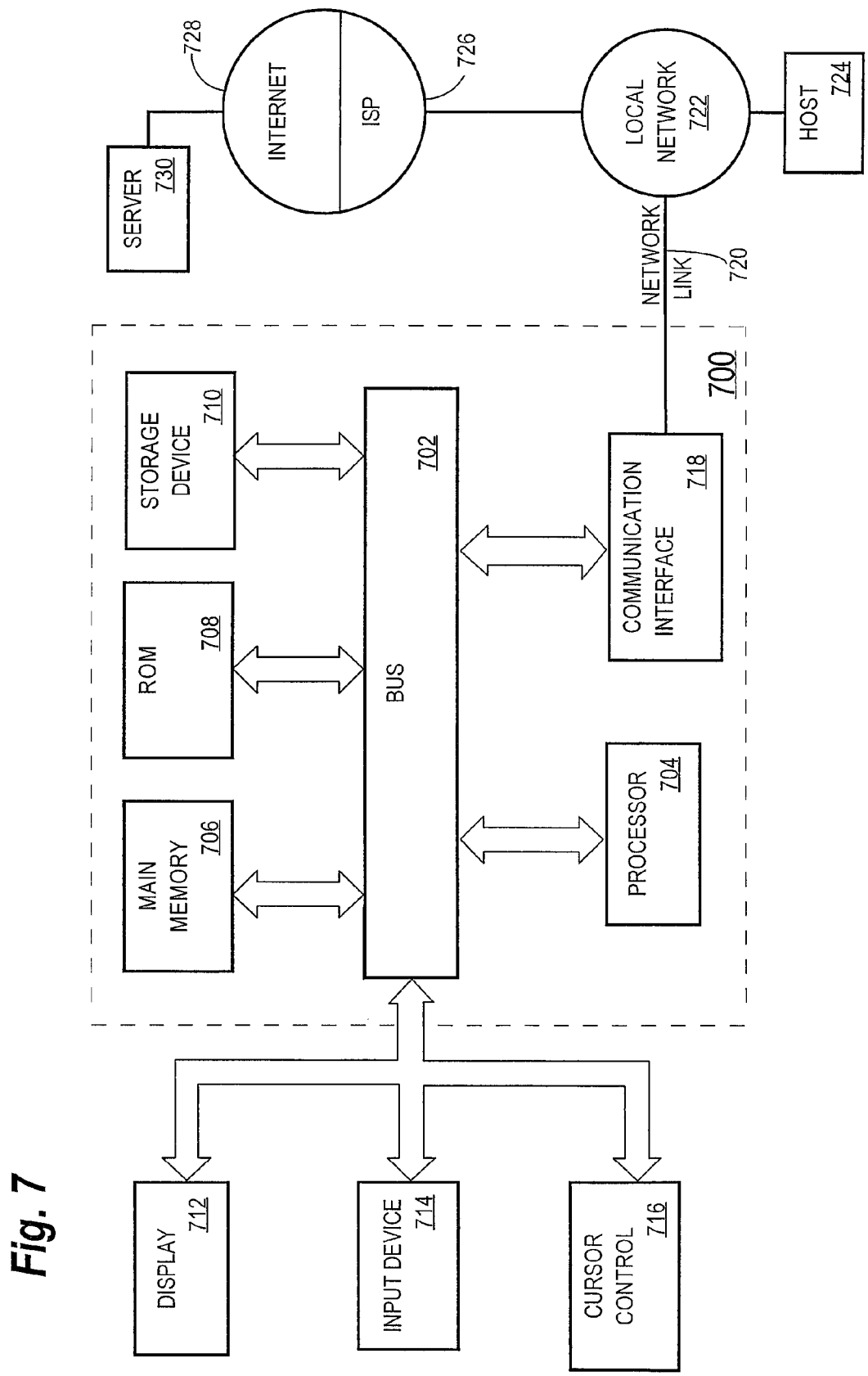
FIG. 7 is a block diagram of a computer system upon which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions for retrieving information in an electronic messaging (EM) environment, wherein the machine-executed operation is at least one of:
   A) sending said instructions;
   B) receiving said instructions;
   C) storing said instructions; and
   D) executing the instructions;
wherein said instructions are instructions which, when executed by one or more processors, cause the one or more processors to perform the steps of:
   determining whether any text within an EM conversation qualifies as a suggested word for a first participant in the EM conversation based, at least in part, on whether the text belongs to a user-customized set of suggested words associated with a second participant in the EM conversation, wherein the second user is different than the first participant;
   displaying, to the first participant, text within the EM conversation that qualifies as a suggested word in a manner that visually distinguishes the suggested word from text of the EM conversation that does not qualify as a suggested word; and
   in response to user input received by an EM client, causing the EM client to initiate an operation to retrieve information related to one or more words selected from the EM conversation displayed by the EM client; and
   in response to receiving results of said operation, the EM client generating a display that reflects the results.

2. The method of claim 1 wherein the step of generating a display includes generating a panel that reflects the results.

3. The method of claim 1 wherein the step of generating a display includes generating a pop up window that reflects the results.

4. The method of claim 1 wherein:
   the user input is second user input received after first user input; and
   the instructions include instructions for, prior to receiving the second user input, receiving the first user input that selects the one or more words from unhighlighted text of the EM conversation.

5. The method of claim 1 wherein:
   the user input selects text that has been highlighted as a suggested word; and
   the step of causing the EM client to initiate an operation to retrieve information related to one or more words includes causing the EM client to initiate an operation to retrieve information related to the suggested word.

6. The method of claim 5 wherein:
   suggested words are organized in categories; and
   the instructions further includes instructions for the EM client determining that the text qualifies a suggested word based on a subscription, of a user of the EM client, to a category that includes said suggested word.

7. The method of claim 5 wherein:
   suggested words are specified in packages; and
   the instructions further include instructions for the EM client determining that the text qualifies a suggested word based on a subscription, of a user of the EM client, to a package that includes said suggested word.

8. The method of claim 7 wherein the package is a user-customized package that specifies to the EM client which words a particular user wants treated as suggested words.

9. The method of claim 8 wherein the package contains at least one regular expression used to specify a pattern; wherein words within the EM conversation are treated as suggested words when the words match the pattern specified by the regular expression; wherein the regular expression comprises one or more non-alphanumeric characters.

10. The method of claim 8 wherein the package contains data that indicates, for at least one suggested word specified in the package, whether the suggested word is case sensitive.

11. The method of claim 1 wherein the operation to retrieve information is performed based, at least in part, on information from a profile of a user of the EM client.

12. The method of claim 6 wherein the operation to retrieve information is performed based, at least in part, on the category that includes said suggested word.

13. The method of claim 12 wherein the category is associated with a search source, and the operation to retrieve information includes retrieving information from said search source.

14. The method of claim 7 wherein the operation to retrieve information is based, at least in part, on the package that includes said suggested word.

15. The method of claim 14 wherein the package is associated with a search source, and the operation to retrieve information includes retrieving information from said search source.

16. The method of claim 5 wherein the suggested word is associated with a search source, and the operation to retrieve information includes retrieving information from said search source.

17. The method of claim 1 wherein the operation to retrieve information is based, at least in part, on one or more words of the EM conversation, other that the one or more selected words.

18. The method of claim 6 wherein:
the instructions further include instructions for determining the level, of a plurality of possible levels, of the subscription of the user to the category that includes the suggested word; and
the EM client determines that the text qualifies a suggested word based, in part, on the level of the subscription of the user of the EM client to the category that includes said suggested word.

19. The method of claim 1 wherein:
the EM conversation is an instant messaging conversation; and
the EM client is an instant messaging client.

20. The method of claim 1 wherein:
the EM conversation is an email conversation; and
the EM client is an email client.

21. A method comprising performing a machine-executed operation involving instructions for retrieving information in an EM environment, wherein the machine-executed operation is at least one of:
A) sending said instructions;
B) receiving said instructions;
C) storing said instructions; and
D) executing the instructions;
wherein said instructions are instructions which, when executed by one or more processors, cause the one or more processors to perform the steps of:
determining whether any text within an EM conversation qualifies as a suggested word for a first participant in the EM conversation based, at least in part, on whether the text qualifies as a suggested word for a second participant in the EM conversation, wherein the second participant is different than the first participant;
in response to first user input received by an EM client, causing the EM client to initiate a first operation to retrieve, from a first set of one or more sources, first information related to a first set of one or more words selected from an EM conversation displayed by the EM client;
in response to receiving results of said first operation, the EM client generating a display that reflects the results of said first operation;
in response to second user input received by the EM client, causing the EM client to initiate a second operation to retrieve, from a second set of one or more sources, second information related to a second set of one or more words selected from the EM conversation displayed by the EM client; and
in response to receiving results of said second operation, the EM client generating a display that reflects the results of said second operation;
wherein the first set of one or more sources is different than the second set of one or more sources;
the first set of one or more sources are used for the first operation based on the first set of one or more words being associated with a first category; and
the second set of one or more sources is used for the second operation based on the second set of one or more words being associated with a second category.

22. The method of claim 21 wherein:
the first set of one or more sources are used for the first operation based on the first set of one or more words being associated with a first subscribed package; and
the second set of one or more sources is used for the second operation based on the second set of one or more words being associated with a second subscribed package.

23. The method of claim 21 wherein:
search terms used during the first operation are based, at least in part, on the first set of one or more words belonging to the first category; and
search terms used during the second operation are based, at least in part, on the second set of one or more words belonging to the second category.

24. The method of claim 22 wherein:
search terms used during the first operation are based, at least in part, on the first set of one or more words belonging to the first package; and
search terms used during the second operation are based, at least in part, on the second set of one or more words belonging to the second package.

25. A method comprising performing a machine-executed operation involving instructions for retrieving information in an EM environment, wherein the machine-executed operation is at least one of:
A) sending said instructions;
B) receiving said instructions;
C) storing said instructions; and
D) executing the instructions;
wherein said instructions are instructions which, when executed by one or more processors, cause the one or more processors to perform the steps of:
displaying an EM conversation at an EM client;
determining whether any text within the EM conversation qualifies as a suggested word for a first participant in the EM conversation based, at least in part, on whether the text qualifies as a suggested word for a second participant in the EM conversation, wherein the second participant is different than the first participant;
wherein within the EM conversation displayed by the EM client, a set of one or more words is not associated with any link;
while the set of one or more words are not selected by the EM client, receiving first user input at the EM client;
in response to the first user input, the EM client selecting said set of one or more words;
while the set of one or more words is selected, receiving second user input at the EM client; and
in response to the second user input, causing the EM client to initiate an operation to retrieve, from a set of one or more sources, information related to the set of one or more words.

26. The method of claim 25 wherein:
prior to receiving the first user input, the set of one or more words is displayed in the EM conversation without any highlighting; and
after receiving the first user input, the set of one or more words is displayed within the EM conversation with highlighting.

27. The method of claim 25 wherein the step of initiating an operation to retrieve information includes sending at least one of the words in the set of one or more words to a search engine.

28. The method of claim 25 wherein the step of receiving first user input includes receiving user input produced by:
- pushing a mouse button down at the start of target text,
- holding the mouse button down while dragging a cursor to the end of the target text, and then
- releasing the mouse button.

29. The method of claim 25 wherein the instructions include instructions for:
- the EM client displaying an information retrieval control in an inactive state prior to receiving the first user input;
- the EM client displaying the information retrieval control in an active state in response to receiving the first user input; and
- receiving the second user input through said information retrieval control.

30. The method of claim 25 wherein:
- the EM conversation includes one or more words that are highlighted as suggested words; and
- said set of one or more words do not include any words that are highlighted as suggested words.

31. A method comprising performing a machine-executed operation involving instructions for retrieving information in an electronic messaging (EM) environment, wherein the machine-executed operation is at least one of:
- A) sending said instructions;
- B) receiving said instructions;
- C) storing said instructions; and
- D) executing the instructions;

wherein said instructions are instructions which, when executed by one or more processors,
cause the one or more processors to perform the steps of:
- determining whether any text within an EM conversation qualifies as a suggested word based, at least in part, on whether a first user, that sent the text to the EM conversation, identified the text as a suggested word;
- displaying, to a second user that received text to the EM conversation and that is different than the first user, any text within the EM conversation that qualifies as a suggested word in a manner that visually distinguishes the suggested word from text of the EM conversation that does not qualify as a suggested word; and
- in response to user input received from the second user by an EM client, causing the EM client to initiate an operation to retrieve information related to one or more words selected from an EM conversation displayed by the EM client; and
- in response to receiving results of said operation, the EM client generating a display that reflects the results.

32. The method of claim 31 wherein the EM client determines that a word in the EM conversation qualifies as a suggested word in response to the user demarcating the word with a special start tag and end tag.

33. The method of claim 31 wherein the EM client determines that a word in the EM conversation qualifies as a suggested word in response to the user pressing a particular key combination to start the word, and a particular key combination to end the word.

34. A method comprising performing a machine-executed operation involving instructions for retrieving information in an electronic messaging (EM) environment, wherein the machine-executed operation is at least one of:
- A) sending said instructions;
- B) receiving said instructions;
- C) storing said instructions; and
- D) executing the instructions;

wherein said instructions are instructions which, when executed by one or more processors,
cause the one or more processors to perform the steps of:
- determining whether any text within an EM conversation qualifies as a suggested word for a first participant in the EM conversation based, at least in part, on whether the text qualifies as a suggested word for a second participant in the EM conversation, wherein the second participant is different than the first participant;
- displaying, to the first participant, any text within the EM conversation that qualifies as a suggested word in a manner that visually distinguishes the suggested word from text of the EM conversation that does not qualify as a suggested word; and
- in response to user input received from the first participant by an EM client, causing the EM client to initiate an operation to retrieve information related to one or more words selected from an EM conversation displayed by the EM client; and
- in response to receiving results of said operation, the EM client generating a display that reflects the results.

35. The method of claim 34 wherein, if a particular word qualifies as a suggested word for any participant in the EM conversation, then the particular word qualifies as a suggested word for all participants in the EM conversation.

36. The method of claim 34 wherein the instructions include instructions for receiving input that indicates that the first participant has opted in to share a set of suggested words associated with said second participant.

* * * * *